United States Patent [19]
Zastawny

[11] 3,720,428
[45] March 13, 1973

[54] PIPE COUPLING

[75] Inventor: Jaroslaw Zastawny, Weston, 626 Ontario, Canada

[73] Assignee: Canron Limited, Rexdale, Ontario, Canada

[22] Filed: Jan. 25, 1971

[21] Appl. No.: 109,384

[52] U.S. Cl. ................. 285/368, 285/374, 285/416
[51] Int. Cl. ............................................. F16l 21/02
[58] Field of Search......285/337, 368, 412, 413, 416, 285/12, 374; 277/101

[56] References Cited

UNITED STATES PATENTS

| | | | |
|---|---|---|---|
| 1,061,712 | 5/1913 | Whitaker | 285/337 |
| 3,469,852 | 9/1969 | Smith et al. | 285/413 X |
| 3,594,023 | 7/1971 | Yano | 285/337 |
| 3,433,509 | 3/1969 | Jeffery et al. | 285/416 X |
| 969,422 | 9/1910 | Tanner et al. | 285/368 X |
| 2,992,022 | 7/1961 | Risley et al. | 285/337 X |
| 3,524,662 | 8/1970 | Tolman et al. | 285/368 |

*Primary Examiner*—Thomas F. Callaghan
*Attorney*—Alan Swabey

[57] ABSTRACT

A pipe coupling to restrain a pipe joint between a bell end type pipe and a spigot end type pipe having stop means close to the end thereof. The coupling includes two interchangeable flanges interconnected and each defining a circular bore therein to define a first and second annular recess. The first annular recess is adapted to bear uniformly on the surface of the pipe bell while the second annular recess is adapted to exert a downward pressure on the pipe stop means. The joint is restrained by adjustable fastening means interconnecting the two flanges in spaced apart relationship over the pipes one on each side of the joint.

6 Claims, 3 Drawing Figures

PATENTED MAR 13 1973 3,720,428

INVENTOR
Jaroslaw ZASTAWNY

Alan Swabey
ATTORNEY

PIPE COUPLING

BACKGROUND OF INVENTION

1. Field of Invention

This invention relates to pipe couplings, and more particularly to a reversible pipe flange for restraining joints in a pipe line against separation by longitudinal thrust.

2. Description of Prior Art

Conventional cast iron pipe used for water-distribution pipelines usually has a bell at one end which is recessed on the inside surface to accommodate a sealing gasket or compound. The joint between two lengths of such pipe is made by inserting the plain end or spigot of one pipe into the bell of the adjacent pipe. The presence of a sealing gasket or compound interposed between the bell and spigot surfaces of the two pipes seals the joint against leakage.

Pipe joints of the type described are known in the trade as push-on joints. These types of joints are easily assembled but they also can be easily separated unless means are provided for holding the coupled pipe joints together. The pipe joints in pressurized pipelines especially are easily separated because the longitudinal thrust force caused by the internal pressure tends to separate the pipe at the joints unless some type of external restraint is applied to hold the pipe together.

One method which is common practice to restrain cast iron pipes against longitudinal thrust, is to attach collars of massive concrete to the pipe at short intervals along the pipeline and to secure these collars to the earth foundation or to some other supporting structure. Special attention is usually given to restraining the joints at elbows, tees, crosses, etc., in the pipeline which require massive thrust blocks to bear against in order to prevent the pipeline from becoming separated at the joints.

Mechanical means known to date for restraining bell-and-spigot type push-on joints against longitudinal thrust using various types of joint harness have not proven favorable. The joint harness usually depends on making connection between a bell flange and a spigot flange whereby a loose spigot flange on one pipe being joined is secured to a bell flange on the adjacent pipe. The bell flange in this case is usually a projection on the bell joint and casted integrally therewith. On the other hand, the loose spigot flange may have any one of several designs and arrangements for securing the spigot end of one pipe to the bell end of the adjacent pipe. Also, the loose spigot flange may be a flat disc, or it may be fabricated with an integral ring protruding from the bore of the flange which is made to bear against a stop-off means. In either case this type of spigot-flange construction has a significant fault or weakness, especially when the stop-off means at the spigot end is a secondary ring of metal welded to the pipe. The spigot flange under these circumstances has a tendency to pry beneath the stop-off means and to lift it free of the pipe surface fracturing the weld in the process.

Further methods known for providing a stop-off means at the spigot end rely on friction force to secure the spigot flange to the spigot end of the pipe. The friction force in these instances is obtained from set screws passing through the spigot flange and made to bear against the pipe at the spigot.

In each of the arrangements above described, the restraining means is comprised of numerous components as well as separate and distinct bell and spigot flanges, and are limited in their application.

SUMMARY OF INVENTION

It is therefore an object of the present invention to provide a clamp mechanism having restraining flanges which may be used interchangeably at the spigot end or behind the bell of push-on joints, and being adapted to prevent damage of the pipe coupling under the stress of internal hydrostatic pressure.

According to one broad aspect, the present invention relates to a pipe coupling for restraining a pipe joint between a first pipe having a bell type end and a second pipe having a spigot end and stop means secured thereabout near the end thereof. The coupling comprises two interconnectable flanges each having a circular bore therein defining a bore surface. A first annular recess is provided in the bore surface on one side of the flange and adapted to bear uniformly on a portion of the surface of the pipe bell. A second annular recess in the bore surface on the opposite side of the flange and adapted to exert a downward pressure on the pipe stop means. Adjustable fastening means interconnect the two flanges in spaced apart relationship so that one of the two flanges bears on the pipe bell of the first pipe and the other bears on the stop means of the second pipe to thereby restrain the joint.

It is a further object of the present invention to provide a pipe joint flange which is reversible for use at both ends of a coupling.

Accordingly, from another broad aspect, the present invention provides a reversible flange adapted for use in a pipe coupling for restraining a pipe joint between a first pipe having a bell type end and a second pipe having a spigot end and stop means secured thereabout near the end thereof. The reversible flange comprises a flange member having a circular bore therein defining a bore surface. A first annular recess is provided in the bore surface on one side of the flange member and adapted to bear uniformly on a portion of the surface of a pipe bell. A second annular recess in the bore surface on the opposite side of the flange member is adapted to exert a downward pressure on a pipe stop means.

BRIEF DESCRIPTION OF DRAWINGS

The invention is illustrated, by way of example, in the accompanying drawings in which.

DESCRIPTION OF PREFERRED EMBODIMENTS

Figure 1:
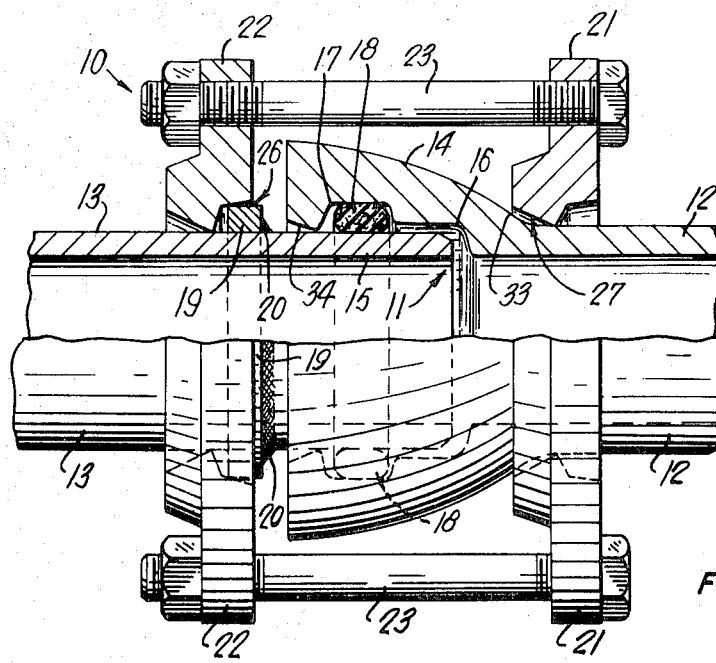
FIG. 1 is a side view, partly in section, illustrating the coupling of the present invention.

Referring to the drawings, and more specifically to FIG. 1, there is shown, generally at 10, a pipe coupling for restraining a push-on joint 11 of two metal pipes 12 and 13. The end of pipe 12 has a bell configuration 14 adapted to receive the spigot end 15 of pipe 13. An annular bore 16 is provided about the inner end surface of the bell end 14 to accommodate the end 15 of pipe 13 so that the inner surfaces of both pipes lie substantially in the same plane. A groove 17 is further provided in annular bore 16 to retain a sealing gasket 18 therein to seal the joint 11 against leakage. A stop means herein shown as a stop metal collar 19 rigidly secured about the outer periphery of pipe 13, a fixed distance from the end of the pipe, so as to be positioned a short distance from the entrance of the bell end 14 of pipe 12 when pipe 13 is inserted in the end of the annular bore 16 of pipe 12. The stop collar 19 is secured to pipe 13 by means such as a weld 20.

The pipe coupling 10 consists of two identical and interchangeable restraining flanges 21 and 22 fitted over the bell portion 14 of pipe 12 and the spigot end 15 of pipe 13, and interconnected to each other by adjustable fastening means such as bolts or tie-rods 23.

Figure 2:
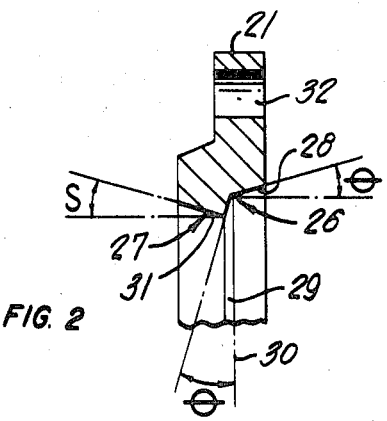
FIG. 2 is a partial, sectioned side view of a reversible flange.
Figure 3:
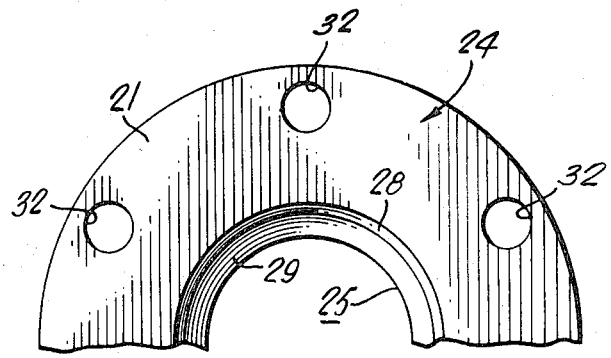
FIG. 3 is a partial plan view of a reversible flange.

Since both flanges 21 and 22 are identical, for purpose of description reference is made to flange 21 only as illustrated in FIGS. 2 and 3. The flange 21 consists of an annular disc 24 defining a circular bore 25, at the center thereof, having a diameter slightly larger than the outside diameter of the pipes 12 and 13. A plurality of holes 32 are provided about the flange 21 to receive bolts 23 therein to interconnect the flanges. On each side of the flange and in the surface of the bore 25 there is provided a first and second countersunk annular recess 26 and 27, respectively. The first recess 26 is adapted to fit over the collar 19 secured to the spigot end 15 of pipe 13. The recess 26 defines a first tapered surface 28 extending within a major portion of recess 26 and sloping radially outwardly at an angle $\theta$ of approximately 10° to 12° from the longitudinal axis of the pipes retained through the bore 25 of the flange 21. A second beveled surface 29 is disposed at the bottom of the recess 26 and slopes angularly upwards and outwards and also at an angle $\theta$ of approximately 10° to 12° to meet with the surface 28 thereby forming a substantially V-shaped recess 26. The second recess 27 defines a tapered surface 31 sloping radially outwards at an angle S substantially identical to the sloping shoulder 33 of the bell portion 14 of the pipe 12.

Referring to FIG. 1, there is shown the function of the countersunk recesses 26 and 27 when the flanges are adapted to retain the pipe joint 11. It can be seen that the tapered surface of the recess 27 allows the flange 21 to bear uniformly at the shoulder 33 of the bell 14 giving the broadest possible distribution to stresses between the flange and the bell and thereby avoiding a concentration of point stresses at the bell which may be detrimental to the safe operation of the pipe. The recess 26 of flange 22 associated with the collar 19 causes the flange 22 to bear downwards on the collar 19 by pressing it firmly against the surface of pipe 13 when thrust forces begin acting to separate the pipe joint. The bolts 23 are actually tightened to finger tightness leaving the joint loose and flexible. The beveled surface 29 also acts to prevent the collar 19 from being lifted from the surface of the pipe 13 when longitudinal thrust forces are in operation at the restraint joint 11. When the bolts 23 are rigidly tightened, the recess 26 acting on the collar 19 pushes the end 15 of the spigot pipe 13 to the end of the annular bore 16. A beveled edge 34 is provided at the entrance of the bell 14 to facilitate insertion of the end 15 of pipe 13 and also to permit the welding 20 at the side of the collar 19 to locate in close proximity therewith when the pipe coupling 10 is tightened.

Having described the preferred forms of the invention, further modifications will be evident to those skilled in the art without departing from the spirit of the invention. For example the preferred embodiment has been shown to be a flange of unit construction but a split flange or a flange of multiple segments may be desirable to facilitate installation of the flanges at the joints of existing pipelines where the joints cannot be easily separated for installation of bell and spigot flanges having a unit construction.

I claim:

1. A pipe joint construction comprising a first pipe having a bell type end and a second pipe having a spigot end with a stop collar circumferentially welded about the surface thereof near the end, said first pipe spigot end being received into said bell type end, and a sealing gasket retained between the walls of both pipes adjacent their connected ends and forming a sealed joint therewith, two identical and interconnectable flanges each having a circular bore therein defining a bore surface, a first annular recess in said bore surface on one side of said flange and adapted to bear uniformly on a portion of the surface of said pipe bell, a second annular recess in said bore surface on the opposite side of said flange and having a surface sloping radially outward to engage with said stop collar to cause said flange to exert a radially inward pressure on said collar whereby to prevent said collar from being lifted from the surface of said second pipe when said pipe joint is subjected to longitudinal thrust forces due to internal pressure in the pipes, and adjustable fastening means for interconnecting said two flanges in spaced apart relationship so that one of said two flanges bears on said bell of said first pipe and the other bears on said stop collar of said second pipe to thereby restrain said joint.

2. A pipe coupling as claimed in claim 1 wherein said first annular recess is a tapered uniform surface sloping radially outwards at an angle substantially identical to the angle of said portion of said bell in contact therewith.

3. A pipe coupling as claimed in claim 1 wherein said second annular recess comprises a first tapered surface sloping upwardly outwards to the side of said flange and a second beveled surface extending angularly upwards from said bore surface to said first tapered surface.

4. A pipe coupling as claimed in claim 3 wherein said first tapered surface and said second beveled surface define a recess of substantially open V-shape cross-section to receive a portion of said stop collar when positioned thereabout.

5. A pipe coupling as claimed in claim 1 wherein said adjustable fastening means comprises a plurality of bolts interconnecting said two flanges and a nut on one end of each of said bolts to adjust the tension between said flanges thereby restraining said joint.

6. A pipe coupling as claimed in claim 1 wherein said stop collar is an annular collar having a flat upper face.

* * * * *